Sept. 7, 1926.

E. P. GRAY 1,598,714

METHOD OF FASTENING TUBING TO FITTINGS

Filed May 7, 1925

INVENTOR.
EMMET P. GRAY

BY
Charles E. Kinney
ATTORNEY.

Patented Sept. 7, 1926.

1,598,714

UNITED STATES PATENT OFFICE.

EMMET P. GRAY, OF DETROIT, MICHIGAN.

METHOD OF FASTENING TUBING TO FITTINGS.

Application filed May 7, 1925. Serial No. 28,590.

This invention relates to method of and means for attaching metal tubing to a fitting, and the object of the invention is to provide a simple means for securing the tubing to the fitting without threading either member and in which a practically fluid tight connection is quickly and easily secured.

By my invention, as hereinafter described, steel tubing of a thin wall may be readily attached to a cast metal fitting, of any type, for instance an elbow or an exhaust manifold of an internal combustion engine, much more quickly than by any method heretofore known and in a manner to prevent longitudinal or rotative movement of the pipe. These objects and the several novel features of the invention are hereinafter more fully described and claimed, and the preferred form of construction of a fitting for the connection of a pipe thereto is shown in the accompanying drawings, in which—

Figure 1:
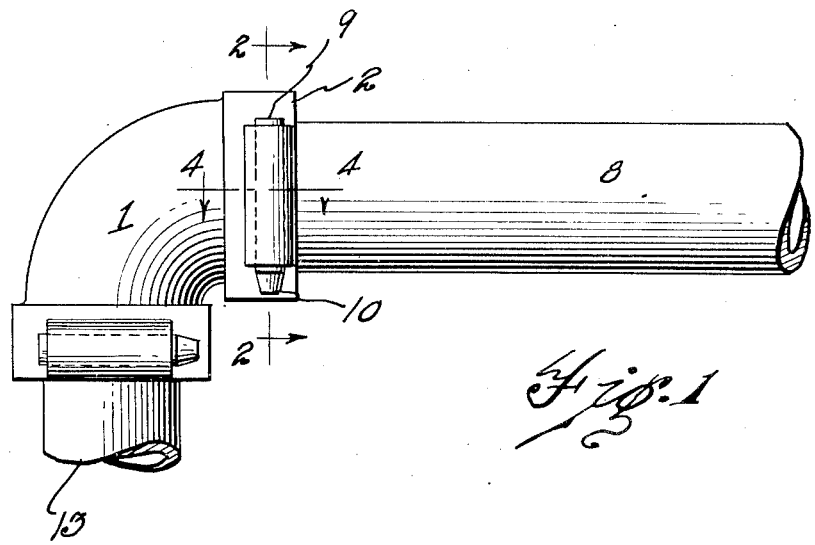
Fig. 1 shows a fitting in the form of an elbow with sections of pipe attached thereto.

The invention is adaptable for use with any type of fitting to which a thin walled tube is to be connected and the elbow shown in Fig. 1 is one type only of a fitting with which the invention may be utilized. For the purpose of illustration I have shown an elbow with which the tubing is connected.

Figure 2:
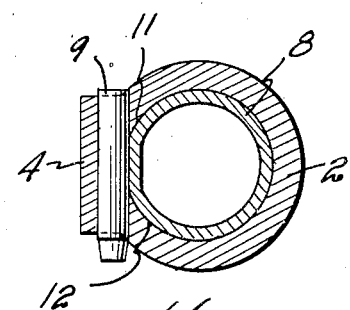
Fig. 2 is a section taken on line 2—2 of Fig. 1.
Figure 3:
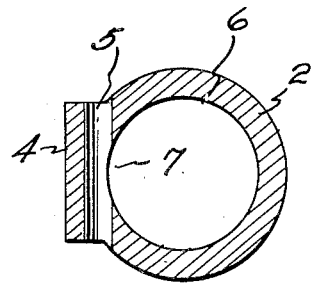
Fig. 3 is a section on the same line with the pipe and fastening means removed.

The fitting 1 is provided with an end portion 2 which, as shown in the section Fig. 3, has a boss on one side thereof provided with an aperture 5 at a right angle to the end opening 6 in which the tubing is to be secured. The aperture 5 opens into the aperture 6 at the point 7. The pipe 8 which is to be used with the fitting is slightly less in diameter than the opening 6—that is, with a one and one-half inch outside diameter tubing the opening in which the tubing is to be located should be approximately one and thirty-three sixty-fourths inches in diameter thus making a fitting in which the tubing is originally not a tight fit and is therefore readily assembled in place. When the end 8 of the tubing has been inserted in the fitting, a pin 9 is driven into the aperture 5. This pin 9 has the entering end 10 slightly tapered in form for a short distance, the pin itself preferably being otherwise of uniform diameter. This tapered end of the pin, when driven into the aperture 5, first contacts with the adjacent surface of the tubing and forces the same to the right hand side of the fitting shown in Fig. 2. At this time the tubing is slightly eccentric to the axis of the fitting and does not closely engage the walls of the fitting on the left side or point engaged by the pin. As the pin is driven home the wall of the tubing is deformed slightly as will be understood from Fig. 4 and the first effect of the driving the pin is to crowd the tube wall at the points 11 and 12 into tight contact with the fitting and, as the pin naturally is in wedging engagement with the tube, the tube end is made to engage the walls of the fitting throughout its surface so tightly that it cannot be moved without removal of the pin.

It, of course, cannot be moved rotatively not only due to the pressure with which the surface of the wall of the tube engages the fitting but due to the deformed portion in contact with the pin and for the same reason the tube may not be moved longitudinally of the fitting.

With this method of attaching a comparatively thin walled tube by deforming the same to forcibly engage the fitting, the parts are more quickly assembled than by the usual method of threading the tube and fitting and a leak proof joint is secured due to the pressure exerted by deforming the pipe at the point of engagement with the fitting. Thus a fitting is secured that is adapted for many uses, one of which for instance would be in the attachment of a steel tubing to the exhaust manifold of an internal combustion engine or in attaching the tubing to an elbow as shown in Fig. 1 in which the pipe 8 is secured to one end of the elbow and the pipe 13 is secured in like manner to the other end; both ends of the fitting being provided with pins as above described.

Figure 4:
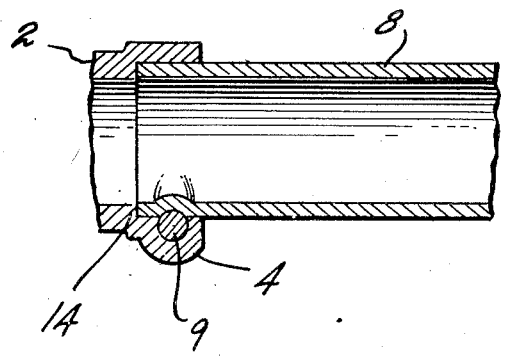
Fig. 4 is a section taken on line 4—4 of Fig. 1.

I have shown in Fig. 4 a construction in which the end of the tube seats against a shoulder 14 but it is to be understood that the fitting is not necessarily provided with a shoulder but is preferably so provided in the usual conduits in which the interior diameter of the fitting is approximately equal to the interior diameter of the tubing.

It will be readily understood that this manner of attaching tubing to a fitting may be employed with various diameters of tubes and that the difference in diameter between the tube and the opening in the fitting to which the tube is to be attached may vary considerably and the variation in sizes of the tube and the fitting above given may be departed from, the essential point being that the relationships of the parts are such that the tube will, upon deforming by introduction of the pin, fill the opening or fitting after the manner described.

Having thus briefly described my invention, what I claim and desire to secure by Letters Patent of the United States is—

1. The method of securing a thin walled tube in a fitting which consists in the insertion of the tube in an opening of slightly larger diameter provided in the fitting and driving a pin through the fitting at a right angle to the axis of the tube and inwardly deflecting the tube wall at the point of its circumference engaged by the pin and thereby causing the tube wall to be expanded at each side of the said point to tight engagement with the fitting throughout the surface of the tube on a plane cutting through the axis of the pin.

2. The method of securing a tube in a fitting in sealed relation which consists in the insertion of the tube in a circular opening provided therefor in the fitting and forcing a pin or like element between the fitting and the tube at one side thereof at practically a right angle to the axis of the tube to inwardly deflect the tube wall at the surface contacted by the element and force the remainder of the tube surface in the plane of the deflection into tight engagement with the wall of the opening.

3. The method of securing a tube to a fitting to form a sealed joint which consists in the insertion of a cylindrical tube into a circular opening of a slightly greater diameter provided therefor in the fitting and then causing a comparatively slight inward deflection of the tube wall at one side and in a plane at substantially a right angle to the tube axis and thereby forcing the remainder of the tube surface in the plane of the deflection to tight engagement with the wall of the opening through expansion of the tube resulting from the said deflection.

In testimony whereof, I sign this specification.

EMMET P. GRAY.